United States Patent Office 3,461,939
Patented Aug. 19, 1969

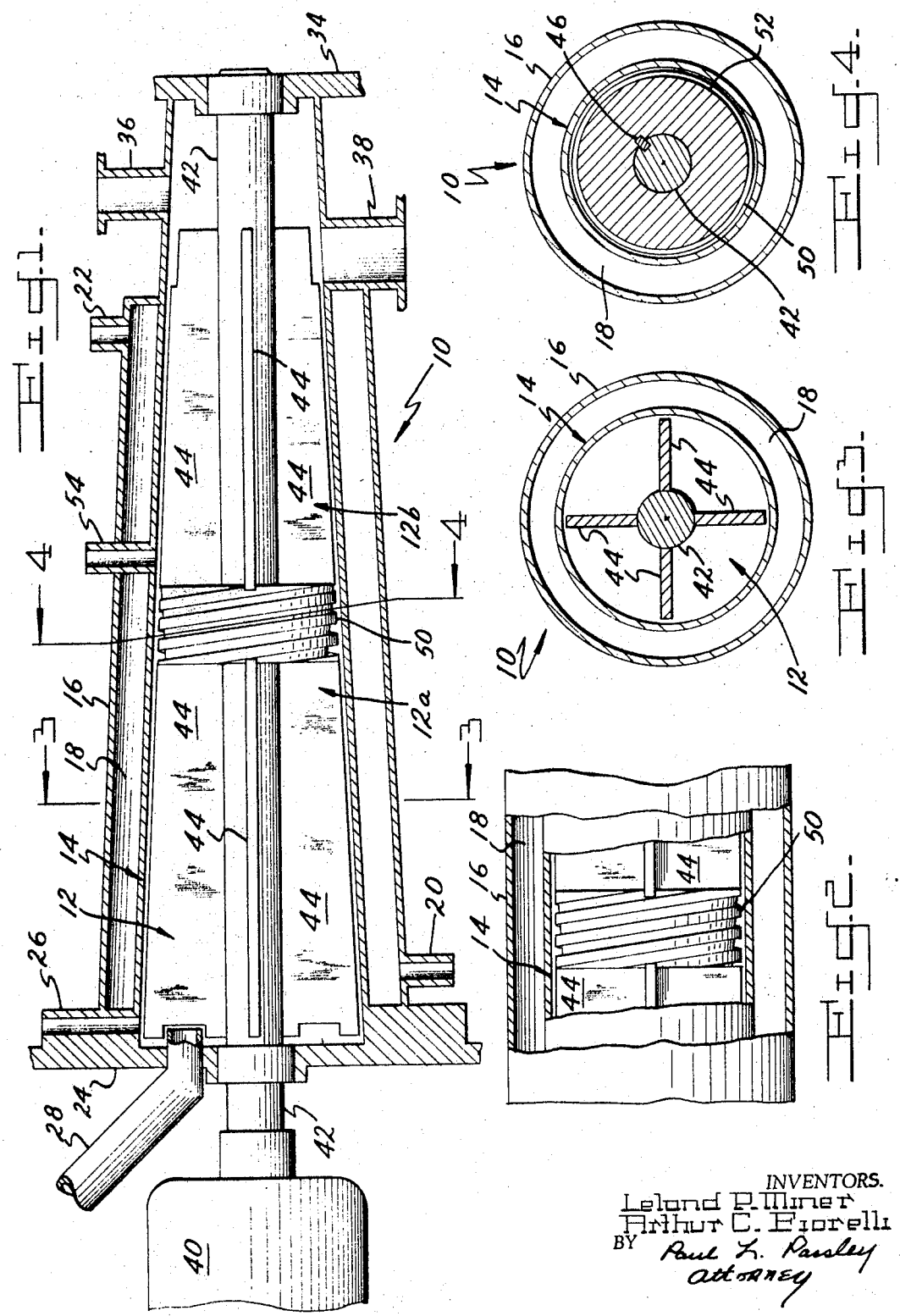

3,461,939
FLUID MATERIALS PROCESSING
Arthur C. Fiorelli, South Amherst, and Leland P. Miner, Wilbraham, Mass., assignors to Monsanto Company, St. Louis, Mo., a corporation of Delaware
Filed June 10, 1966, Ser. No. 556,741
Int. Cl. B01d 1/00
U.S. Cl. 159—6
7 Claims

ABSTRACT OF THE DISCLOSURE

This application describes multizone, thin film type, fluid processing apparatus having unique transfer zones between adjacent processing zones which serve as vapor barriers. The apparatus is capable of handling fluid material whose viscosities exceed 100,000 centipoises at processing conditions.

---

This invention relates to processing fluid materials, particularly viscous fluid materials.

This process industries are constantly confronted with a variety of problems in processing fluid materials. Most fluid materials require undergoing some type of change; for example, devolatilization or separation, from an initial environment before they are suitable for further processing and future uses. Particularly is such a change required when processing synthetic polymeric materials that contain residual monomeric components, volatile reaction products, solvents and the like. The presence of extraneous materials with polymeric materials adversely affects subsequent processing operations and properties of the ultimate products. A processing method used is that of agitating the fluid materials in a heat exchange process whereby the agitation effects the removal of volatile components. Such a method which has been employed is based on thin-film technology wherein the fluid material is distributed as a thin layer over a heat exchange surface and cause to move along the surface. Although this method and the apparatus devised therefor has been successful in obtaining devolatilization of fluid materials having viscosities below about 100,000 centipoises at operating conditions, it is not successful when processing fluid materials having viscosities which exceed about 100,000 centipoises at operating conditions because the material when devolatilized is not readily movable or mechanically processable by existing equipment.

Accordingly, typical objects of this invention are to provide improved: (1) apparatus in which to process fluid materials; (2) multizone apparatus for the thin-film processing of fluid materials; (3) apparatus capable of handling fluid materials having viscosities which exceed about 100,000 centipoises at operating conditions wherein the material is substantially degassed or devolatilized at least once; and (4) process for altering the environment of fluid materials.

Other objects, aspects and advantages of this invention will become apparent upon further study of this disclosure, the drawings and appended claims.

In accordance with a basic aspect of this invention, apparatus is provided which broadly comprises, in combination, a casing defining a closed chamber having an internal wall; a rotatable member axially disposed within said chamber which comprises a shaft, thin-film distributing means rigidly attached to said shaft and positioned within close relation with said wall, and at least one barrier means attached to said shaft and traversing said distributing means and said closed chamber in a manner such that said chamber is substantially divided into at least two subchambers; and suitable inlets for feed material, outlets for vapors, and an outlet for discharge of products.

This invention will now be described in detail with reference to the drawings wherein: FIGURE 1 is a vertical sectional view through one embodiment of the apparatus of this invention; FIGURE 2 is a fragmentary vertical sectional view through an alternate form of this invention; and FIGURES 3 and 4 are sectional views taken on the respective lines shown in FIGURE 1.

Referring now to the drawings, wherein like numbers refer to like parts throughout, FIGURE 1 depicts an apparatus 10 for processing viscous fluid materials. Casing 14 and end closures 24 and 34 define closed chamber 12 wherein the viscous material undergoes a change. Casing 14 is shown having a decreasing diameter along the longitudinal axis. However, it is to be understood that casing 14 can have a uniform diameter along the longitudinal axis as shown in FIGURE 2; an increasing diameter or any combination of increasing, decreasing and uniform diameters along its length. Surrounding casing 14 and spaced therefrom is jacket 16 which defines annular chamber 18 through which any heating or cooling medium may be pumped as by inlet conduit 20 and outlet conduit 22. It is of course understood that chamber 18, although shown as a single chamber encompassing casing 14, may be divided into a plurality of separate chambers with individual inlets and outlets along the length of casing 14 to provide a plurality of heat exchange zones encompassing casing 14. It is further understood that there is no communication between chambers 12 and 18. Furthermore, it is to be understood that any other type of heat exchange means can be employed in place of the jacket and chamber means as shown, such as a coil, electrical band heaters, and the like. Chamber 12 communicates with a feed source of fluid material (not shown) through conduit 26. Generally some type of pumping means will be employed to introduce the feed material through conduit 26 to maintain a pressure and fluid head in chamber 12 to cause the fluid material to move longitudinally along the surface of chamber 12. Conduit 28 tapped through end closure 24 communicates with chamber 12 and serves as an exist for volatilized materials. Conduit 28 may be connected to a vacuum source of insure complete exhaust of volatilized materials and gases. Another exist for volatilizable materials, which may also be connected to a vacuum source, is provided near the end closure 34 of chamber 12 as indicated by conduit 36 tapped through casing 14. A product outlet conduit 38 communicates with chamber 12 near the end closure 34 for removing the processed fluid material.

Motor 40 drives shaft 42 which is disposed coaxially through chamber 12. Shaft 42 is held in alignment by bearings (not shown) in end plates 24 and 43. Shaft 42 may be hollow and perforated and thus serve as an exit for vapors and gases.

The particular thin-film distributing means as shown in chamber 12 in FIGURE 1 comprises four blades 44 radially projecting from shaft 42 to within close relation of the wall of chamber 12. Blades 44 are spaced 90° apart around shaft 42 and extend along shaft 42 essentially over the length of chamber 12. However, it is to be understood that any number of blades 44 can be employed; also, they can project from shaft 42 as a curve, or they can extend helically around the longitudinal axis of shaft 42. Blades 44 can project on lines intersecting the axes of shaft 42 or they may be attached tangentially to shaft 42. Blades 44 may be relatively short in length and randomly positioned about shaft 42 provided that substantially the entire internal wall of chamber 12 is swept by the blades.

A barrier means 50 is provided intermediate of chamber 12 projecting from shaft 42 and traversing blades 44 and chamber 12 to within close relation of the wall of chamber 12 in a manner such that chamber 12 is substantially divided into subchambers 12a and 12b. Barrier means 50 is of solid or imperforate structure and prevents passage of materials from subchamber 12a and 12b except across the surface thereof maintained in close relation with the wall of chamber 12. Barrier means 50 provides a vapor and pressure seal between the subchambers which prevents volatilized and gaseous materials in one chamber from passing to the other while allowing the fluid material to be readily transferred from one subchamber to a subsequent subchamber. The barrier means also permits different pressures to be maintained in the subchambers so that different processing operations can be conducted in the apparatus of this invention. Barrier means 50 as shown has a helical-type screw surface. Such a surface on the barrier means provides some mechanical input to the fluid material for transferring same from one chamber to another chamber. However, it is to be understood that barrier means 50 can be a rotating or stationary disc or can be flighted in a manner to provide mechanical input to the fluid material other than by the particular type screw shown in FIGURE 1. Also, barrier means 50 can be a combination of discs and/or flighted means provided that a vapor and/or pressure seal is obtained.

Downstream of barrier means 50, an inlet conduit 54 tapped through casing 14 is provided for introducing a feed material into subchamber 12b, if desired.

In FIGURE 2, barrier means 50 is shown positioned in casing 14 which has a uniform diameter along its longitudinal axis as contrasted to the reducing diameter of casing 14 shown in FIGURE 1.

In FIGURE 3 shaft 42 is shown located coaxially within casing 14. Blades 44 are clearly seen projecting from shaft 42 to within close clearance of the internal surface of casing 14. From this figure it is seen that chamber 12 is substantially open except for the shaft 42 and blades 44. In contrast, FIGURE 4 is a cross-sectional view of the apparatus of FIGURE 1 taken through barrier means 50. Barrier means 50 is seen as a solid member tightly surrounding shaft 42 and rigidly held thereto by key means 46. Barrier means 50 substantially traverses the cross section of chamber 12 except for a slight annular area 52 near the internal surface of casing 14. Due to the substantial traverse of chamber 12 by barrier means 50 chamber 12 is thus divided into substantially separate chambers 12a and 12b as indicated in FIGURE 1 with communication therebetween through annular area 52 for passage of fluid material from subchamber 12a to subchamber 12b.

In operation, fluid materials are introduced into chamber 12 through conduit 26. The rotation of blades 44 distributes the fluid material as a thin film against the wall of chamber 12 and the pressurized feed introduction causes the travel or progress of the thin film of fluid material along the wall of chamber 12 whereby it is very rapidly heat exchanged. The materials volatilized are removed from conduit 28. When the fluid material reaches barrier means 50 it is fed into chamber 12b. Chamber 12b is provided with inlet conduit 54 located near barrier means 50 for communication with a source of additional feed material (not shown). In chamber 12b the fluid material undergoes additional change as it passes along the wall of chamber 12 in a manner previously described and is subsequently removed through outlet conduit 38. Any additional volatilization of material obtained in chamber 12b, or gases present therein are removed through outlet 36.

Prior art apparatus is not successful for processing fluid materials having relatively high viscosities because the material does not readily exit through outlet conduit 38. The inclusion of barrier means 50 into this type of apparatus provides for changing the environment of fluid materials in a continuous manner wherein the problems of transporting material which has been devolatilized are circumvented. Barrier means 50, although permitting the travel of fluid material thereacross, serves as a vapor and pressure barrier between subchambers 12a and 12b. Thus, the apparatus described above can permit complete devolatilization of the fluid material in subchamber 12a followed by another process change in subchamber 12b of the devolatilized material so that it is readily processable as it exits conduit 38. Furthermore, the apparatus thus described provides continuous means for processing high viscosity fluid material without being plagued by the problem of transportation of the higher viscosity fluid material that is isolated during the processing operation.

The apparatus of this invention can be employed for conveniently processing any fluid materials and as such is not limited to high viscosity materials. Furthermore, this invention provides improved means for conducting two or more processing steps in a continuous manner without the necessity of transporting and handling the material between separate processing steps. Any processing operation or combinations thereof can be conducted in the apparatus of this invention such as a reaction, separation, devolatilization, absorption, dissolving, and the like. A particular process operation often practiced is that of substituting one solvent or fluid for another one presently associated with fluid materials, such as, replacing the unreacted monomer in a polymerization reaction product with a solvent. Thus, the apparatus of this invention provides for the devolatilization and removal of unreacted monomer from the reaction product in subchamber 12a and the incorporation of a solvent into the devolatilized reaction product in subchamber 12b.

Although the apparatus of this invention as shown in the drawings is positioned horizontally, it is to be understood that the described apparatus can be operated in a vertical position or at any angle of inclination.

It will thus be seen that the objects set forth above, among those made apparent from the preceding description, are efficiently attained and, since certain changes may be made in the above apparatus without departing from the scope of the invention, it is intended that all material contained in the above description shall be interpreted as illustrative and not in a limiting sense.

What is claimed is:

1. A multizone, thin film type, fluid processing apparatus which apparatus comprises in combination:
   (a) a closed chamber having an interior wall and characterized by at least a first and second thin film zone and a transfer zone intermediate said first and second zones;
   (b) a rotor within the chamber;
   (c) means to rotate the rotor;
   (d) rotor blades secured to the rotor in the first and second zones for rotation therewith, the blades generally radially and axially arranged from the rotor, and extending into a close relationship with the interior wall of the chamber in the first and second zones to form a small space between the tips of the blades and the interior wall of the chamber;
   (e) a tapered drum secured to the rotor for rotation therewith in the transfer zone, the drum being adjacent to the adjacent ends of the rotor blades of the first and second zones, and having a helical flight on the surface thereof adapted to move material discharged from the first zone to the second zone, the small diameter end of the drum being adjacent the first zone, and the flight extending from the drum surface into a close relationship with the interior wall of the chamber whereby material from the first zone forms a seal between the transfer zone and the second zone;
   (f) a first inlet in the first zone for the introduction of feed material into the zone;
   (g) a second inlet in the second zone for the introduction of a fluid material to the feed material in the second zone;
   (h) an outlet in the second zone for the removal of processed material from the second zone; and (i) a vapor outlet for the removal of vapor from the closed chamber.

2. Apparatus for processing fluid materials comprising, in combination:
a closed chamber having an interior wall and a varying diameter along its longitudinal axis;
a rotatable member located within said chamber comprising:
   a shaft extending longitudinally through said chamber and coaxially aligned therewith;
   thin-film distributing means comprising a plurality of blades spaced equally angularly apart around said shaft and each of said blades extending essentially over the length of said chamber and projecting to within close relation of said chamber wall along their length;
   at least a first and last barrier means traversing said chamber to within close relation of said chamber wall disposed on said shaft intermediate the length of said chamber wherein said barrier means are solid members rigidly attached to said shaft and having a helical-type screw peripheral surface;
means to rotate said rotatable member;
means for introducing fluid material to said chamber upstream of the first barrier means;
means for introducing fluid materials downstream of each barrier means;
means for discharging fluid from said chamber downstream of the last barrier means; and
means for discharging vapors from said chamber both upstream and downstream of the first and the last barrier means.

3. The apparatus of claim 2 wherein the barrier means is disposed on said shaft at the approximate mid point of the chamber.

4. The apparatus of claim 2 having a single barrier means disposed on said shaft intermediate the length of the chamber.

5. The apparatus of claim 4 wherein the single barrier means is at the approximate mid point of the chamber.

6. Apparatus for processing fluid materials comprising, in combination:
a closed chamber having an interior wall and a varying diameter along its longitudinal axis;
a rotatable member located within said chamber comprising:
   a shaft extending longitudinally through said chamber and coaxially aligned therewith;
   thin-film distributing means comprising four blades spaced equally angularly apart around said shaft and each of said blades extending essentially over the length of said chamber and projecting to within close relation of said chamber wall along their length;
   a barrier means traversing said chamber to within close relation of said chamber wall disposed on said shaft intermediate the length of said chamber wherein said barrier means is a solid member rigidly attached to said shaft and having a helical-type screw peripheral surface;
means to rotate said rotatable member;
means for introducing fluid material to said chamber upstream of the barrier means;
means for introducing fluid materials downstream of the barrier means;
means for discharging fluid from said chamber downstream of the barrier means; and
means for discharging vapors from said chamber both upstream and downstream of the barrier means.

7. Apparatus for processing fluid materials comprising, in combination:
a closed chamber having an interior wall and a varying diameter along its longitudinal axis;
a rotatable member located within said chamber comprising:
   a shaft extending longitudinally through said chamber and coaxially aligned therewith;
   thin-film distributing means comprising four blades spaced equally angularly apart around said shaft and each of said blades extending essentially over the length of said chamber and projecting to within close relation of said chamber wall along their length;
   a barrier means traversing said chamber to within close relation of said chamber wall disposed on said shaft intermediate the length of said chamber wherein said barrier means is a solid member rigidly attached to said shaft and having a helical-type screw peripheral surface;
means to rotate said rotatable member;
means for introducing fluid material to said chamber upstream of the barrier means;
means for introducing fluid materials downstream of the barrier means;
means for discharging fluid from said chamber downstream of the barrier means; and
means for discharging vapors from said chamber both upstream and downstream of the barrier means;
wherein that section of the chamber upstream of the first barrier means has a larger diameter than that section of the chamber downstream of the last barrier means.

References Cited

UNITED STATES PATENTS

| | | |
|---|---|---|
| 1,420,648 | 6/1922 | Mabee. |
| 2,942,656 | 6/1960 | Rodenacker _____ 159—12 |
| 2,992,679 | 7/1961 | Twaddle. |
| 3,023,456 | 3/1962 | Palfey _____ 18—12 |
| 3,115,675 | 12/1963 | Tedder _____ 18—12 |
| 3,211,209 | 10/1965 | Latinen et al. |
| 3,242,969 | 3/1966 | Kiguchi. |
| 3,253,643 | 5/1966 | Gudheim. |

NORMAN YUDKOFF, Primary Examiner

J. SOFER, Assistant Examiner